US012064041B2

(12) United States Patent
Ewing et al.

(10) Patent No.: US 12,064,041 B2
(45) Date of Patent: *Aug. 20, 2024

(54) RETAIL MERCHANDISE DISPLAY DEVICE WITH SECURITY SHIELD

(71) Applicant: Fasteners for Retail, Inc., Twinsburg, OH (US)

(72) Inventors: Brent O. Ewing, Roscoe, IL (US); Keith C. Eden, Rockford, IL (US)

(73) Assignee: Fasteners for Retail, Inc., Twinsburg, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/741,670

(22) Filed: May 11, 2022

(65) Prior Publication Data

US 2022/0265066 A1 Aug. 25, 2022

Related U.S. Application Data

(63) Continuation of application No. 16/800,857, filed on Feb. 25, 2020, now Pat. No. 11,357,341.

(60) Provisional application No. 62/810,685, filed on Feb. 26, 2019.

(51) Int. Cl.
*A47F 3/00* (2006.01)
*G08B 13/08* (2006.01)

(52) U.S. Cl.
CPC .............. *A47F 3/002* (2013.01); *G08B 13/08* (2013.01)

(58) Field of Classification Search
CPC ................................ A47F 3/002; G08B 13/08
USPC .......................................................... 312/237
See application file for complete search history.

(56) References Cited

U.S. PATENT DOCUMENTS

| | | | | |
|---|---|---|---|---|
| 3,686,660 | A | 8/1972 | Massover et al. | |
| 4,449,121 | A | 5/1984 | Sosa | |
| 4,841,283 | A | 6/1989 | Bubliewicz | |
| 4,862,825 | A | 9/1989 | Fontaine | |
| 4,915,460 | A | 4/1990 | Nook et al. | |
| 8,622,227 | B2 | 1/2014 | Bird et al. | |
| 9,318,008 | B2 | 4/2016 | Valiulis et al. | |
| 9,375,100 | B2 | 6/2016 | Dipaolo et al. | |
| 9,404,290 | B2 | 8/2016 | Leyden | |
| 9,706,857 | B2 | 7/2017 | Hardy et al. | |
| 10,121,341 | B2 | 11/2018 | Ewing et al. | |
| 10,736,438 | B1 | 8/2020 | Jhaveri | |
| 10,993,550 | B2 * | 5/2021 | Ewing | H05K 7/1422 |
| 11,087,601 | B1 * | 8/2021 | Ewing | G08B 13/1436 |
| 11,147,394 | B2 * | 10/2021 | Vogler | A47F 5/103 |

(Continued)

FOREIGN PATENT DOCUMENTS

| | | | |
|---|---|---|---|
| KR | 10-1951278 | B1 | 2/2019 |
| WO | WO 2018/233105 | A1 | 12/2018 |

*Primary Examiner* — Daniel J Troy
*Assistant Examiner* — Timothy M Ayres
(74) *Attorney, Agent, or Firm* — Reinhart Boerner Van Deuren P.C.

(57) ABSTRACT

A retail merchandise display device with security shield includes a pair of opposed side supports. One or more peg hooks may be mounted between the pair of side supports within a retail merchandise containment region. A movable shield is positioned over an opening to the retail merchandise containment region. Movement of the shield from a lowed position to a raised position and/or from a raised position to a lowered position is detected by an alarm device of the display, which in turn is configured to produce an alarm signal.

25 Claims, 17 Drawing Sheets

(56) References Cited

U.S. PATENT DOCUMENTS

| | | | | |
|---|---|---|---|---|
| 11,357,341 | B2 * | 6/2022 | Ewing | G08B 13/194 |
| 2007/0236111 | A1 | 10/2007 | Gray | |
| 2009/0166304 | A1 | 7/2009 | Hardy et al. | |
| 2012/0285911 | A1 | 11/2012 | Valiulis | |
| 2013/0327733 | A1 | 12/2013 | Csak | |
| 2016/0012692 | A1 | 1/2016 | Grant et al. | |

* cited by examiner

RETAIL MERCHANDISE DISPLAY DEVICE WITH SECURITY SHIELD

CROSS-REFERENCE TO RELATED PATENT APPLICATION

This patent application is a continuation of U.S. patent application Ser. No. 16/800,857, filed Feb. 25, 2020. This patent application claims the benefit of U.S. Provisional Patent Application No. 62/810,685, filed Feb. 26, 2019, the entire teachings and disclosure of which are incorporated herein by reference thereto.

FIELD OF THE INVENTION

This invention generally relates to retail merchandise display devices, and more particularly to retail merchandise display devices incorporating loss prevention functionality.

BACKGROUND OF THE INVENTION

Loss prevention in the retail merchandise industries remains a paramount concern. Various loss prevention technologies have been implemented to deter both single and multi-product theft. For non-limiting example, some devices may be adhered to product packaging and then sound an alarm upon a potential theft event, such as crossing through a gate at the retail establishment, the removal of a large amount of product from a display at once, etc.

Products that are typically mounted on peg hooks are of particular concern. These products, e.g. disposable razor refills, cosmetics, batteries, etc. are common theft targets given their small size and in many cases high value. Without the proper anti-theft measures, such products are easy to remove from the peg hook and conceal.

Various devices have been introduced to deter such theft, and they typically employ affixing some type of device, e.g. an EAS tag, to each product on the peg hook, or incorporating some type of anti-theft device on each peg hook.

While both of the above solutions in the context of peg hooks are completely viable, they require a one-to-one relationship between the anti-theft device and each product, or a one-to-one relationship between the anti-theft technology and each peg hook. Accordingly, there is a desire in the art for a retail merchandise display device which provides anti-theft technology in the context of a peg hook style display, without the need to utilize such a one-to-one relationship.

BRIEF SUMMARY OF THE INVENTION

In one aspect, the invention provides a retail merchandise display device. An embodiment of such a retail merchandise display device includes a pair of side supports in opposed spaced relation. The side supports define an opening between the pair of side supports providing access to a retail merchandise containment region between the pair of side supports. This embodiment also includes a shield positioned adjacent the opening. The shield is pivotable from a lowered position wherein the retail merchandise containment region is not accessible through the opening, and a raised position wherein the retail merchandise containment region is accessible through the opening. At least one alarm device is arranged to detect at least one of a transition of the shield from the lowered position to the raised position, or a transition from the raised position to the lowered position. An alarm device support bar is positioned between the pair of side supports. The at least one alarm device is mounted to said alarm device support bar.

In an embodiment according to this aspect, each of the pair of opposed side supports are configured to mount to a retail merchandise display device wall as a cantilevered extension.

In an embodiments according to this aspect, the at least one alarm device is configured to produce an alarm signal based on said transitioning of said shield. Optionally, the alarm signal is at least one of a radio transmission, a flashing light, and an audible tone. Optionally, the at least one alarm device can be configured to produce the alarm signal after the shield has remained in the raised position for a predetermined period of time. Additionally or in the alternative, the at least one alarm device is configured to produce the alarm signal upon completion of said transitioning from the lowered position to the raised position or upon completion of said transitioning from the raised position to the lowered position.

In an embodiment according to this aspect, a remote alarm device may also be provided and can be configured to receive the radio transmission from the at least one alarm device, the remote alarm device configured to product a local alarm.

In embodiments according to this aspect, the retail merchandise display device also includes a peg hook support bar extending between the pair of side supports, the peg hook support bar extending parallel to said alarm device support bar. Optionally, the peg hook support bar is configured to support at least one peg hook structure mounted to the peg hook support bar such that the at least one peg hook structure extends within the retail merchandise containment region In an embodiment, the side supports are side panels that extend vertically below a bottom edge of the shield when the shield is in the lowered position.

In an embodiment, a shelf defining a merchandise support surface upon which the merchandise is vertically supported. The shelf vertically supports the pair of side supports.

In an embodiment, the side panels include a lateral stepped region. The lateral stepped region is in contact with the shelf.

In an embodiment, a top panel extends from one side support to the other side support and is vertically above the retail merchandise containment region. The top panel can prevent access to the merchandise containment region from an above position, such as when the device is used relative to a top shelf.

In another aspect, the invention provides a retail merchandise display device. An embodiment of such a retail merchandise display device includes a pair of side supports in opposed spaced relation. The side supports define an opening between the pair of side supports providing access to a retail merchandise containment region between the pair of side supports. A shield is positioned adjacent the opening. At least one alarm device positioned between the pair of side supports. The shield is mounted to the at least one alarm device between the pair of side supports.

In an embodiment, each of the pair of opposed side supports are configured to mount to a retail merchandise display device wall as a cantilevered extension.

In embodiments, the shield is pivotable from a lowered position wherein the retail merchandise containment region is not accessible through the opening, and a raised position wherein the retail merchandise containment region is accessible through the opening. Optionally, the at least one alarm device is arranged to detect at least one of a transition of the shield from the lowered position to the raised position, or a transition from the raised position to the lowered position, and product an alarm signal based on said transitioning. The alarm signal is at least one of a radio transmission, a flashing light, and an audible tone.

In an embodiment, the side supports are side panels that extend vertically below a bottom edge of the shield when the shield is in the lowered position.

In an embodiment, the device includes a shelf defining a merchandise support surface upon which the merchandise is vertically supported. The shelf vertically supports the pair of side supports.

In an embodiment, the pair of side supports are side panel. The side panels include a lateral stepped region. The lateral stepped region being in contact with the shelf. The lateral stepped region may include a downward depending flange that extends adjacent to ends of the shelf for aligning the side panels relative to the shelf in the lateral direction.

In an embodiment, a top panel extends from one side support to the other side support and is positioned vertically above the retail merchandise containment region between the pair of supports.

In yet another aspect, the invention provides a retail merchandise display device. An embodiment of such a retail merchandise display device includes a pair of side supports in opposed spaced relation. The side supports define an opening between the pair of side supports providing access to a retail merchandise containment region between the pair of side supports. A shield is positioned adjacent the opening. The shield is pivotable from a lowered position wherein the retail merchandise containment region is not accessible through the opening, and a raised position wherein the retail merchandise containment region is accessible through the opening. At least one alarm device is arranged to detect at least one of a transition of the shield from the lowered position to the raised position, or a transition from the raised position to the lowered position, the at least one alarm device configured to produce an alarm signal upon detection of said transitioning. The at least one alarm device includes a pivotable mounting plate. The shield is attached to the pivotable mounting plate.

In an embodiment, a peg hook support bar extends between the pair of side supports. At least one peg hook structure is mounted to the peg hook support bar such that the at least one peg hook structure extends within the retail merchandise containment region. The at least one peg hook structure is configured to support retail merchandise in a hanging presentation.

In an embodiment according to this aspect, each of the pair of opposed side supports are configured to mount to a retail merchandise display device wall as a cantilevered extension.

In embodiments according to this aspect, the alarm signal is at least one of a radio transmission, a flashing light, and an audible tone. Optionally, the at least one alarm device is configured to produce the alarm signal after the shield has remained in the raised position for a predetermined period of time. Additionally or in the alternative, the at least one alarm device is configured to produce the alarm signal upon completion of said transitioning from the lowered position to the raised position or upon completion of said transitioning from the raised position to the lowered position.

In an embodiment, the product support device includes a peg hook support bar extending between the pair of side supports; and at least one peg hook structure mounted to the peg hook support bar such that the at least one peg hook structure extends within the retail merchandise containment region. The at least one peg hook structure is configured to support retail merchandise in a hanging presentation.

In an embodiment, the product support device is a shelf, the pair of side supports rest on top of the shelf.

In an embodiment, the at least one alarm device is removable.

In an embodiment according to this aspect, the retail merchandise display device also includes a remote alarm device. The remote alarm device configured to receive the radio transmission from the at least one alarm device, the remote alarm device configured to product a local alarm.

In an embodiment, a security device can be provided. The security provides the security components above but does not need the product display/support devices. For example, such a device may only include a pair of side supports in opposed spaced relation. The side supports define an opening between the pair of side supports providing access to a retail merchandise containment region between the pair of side supports. This embodiment also includes a shield positioned adjacent the opening. The shield is pivotable from a lowered position wherein the retail merchandise containment region is not accessible through the opening, and a raised position wherein the retail merchandise containment region is accessible through the opening. At least one alarm device is arranged to detect at least one of a transition of the shield from the lowered position to the raised position, or a transition from the raised position to the lowered position. An alarm device support bar is positioned between the pair of side supports. The at least one alarm device is mounted to said alarm device support bar In another embodiment, an alarm device is provided. The alarm device includes a main body; a mounting plate pivotally attached to the main body; a base plate attached to the main body; at least one alignment projection projecting from a face of the base plate that faces away from the main body; and at least one releasable fastener connected to the base plate.

In an embodiment, the releasable fastener is a bolt and nut. The bolt extending through an aperture in the base plate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
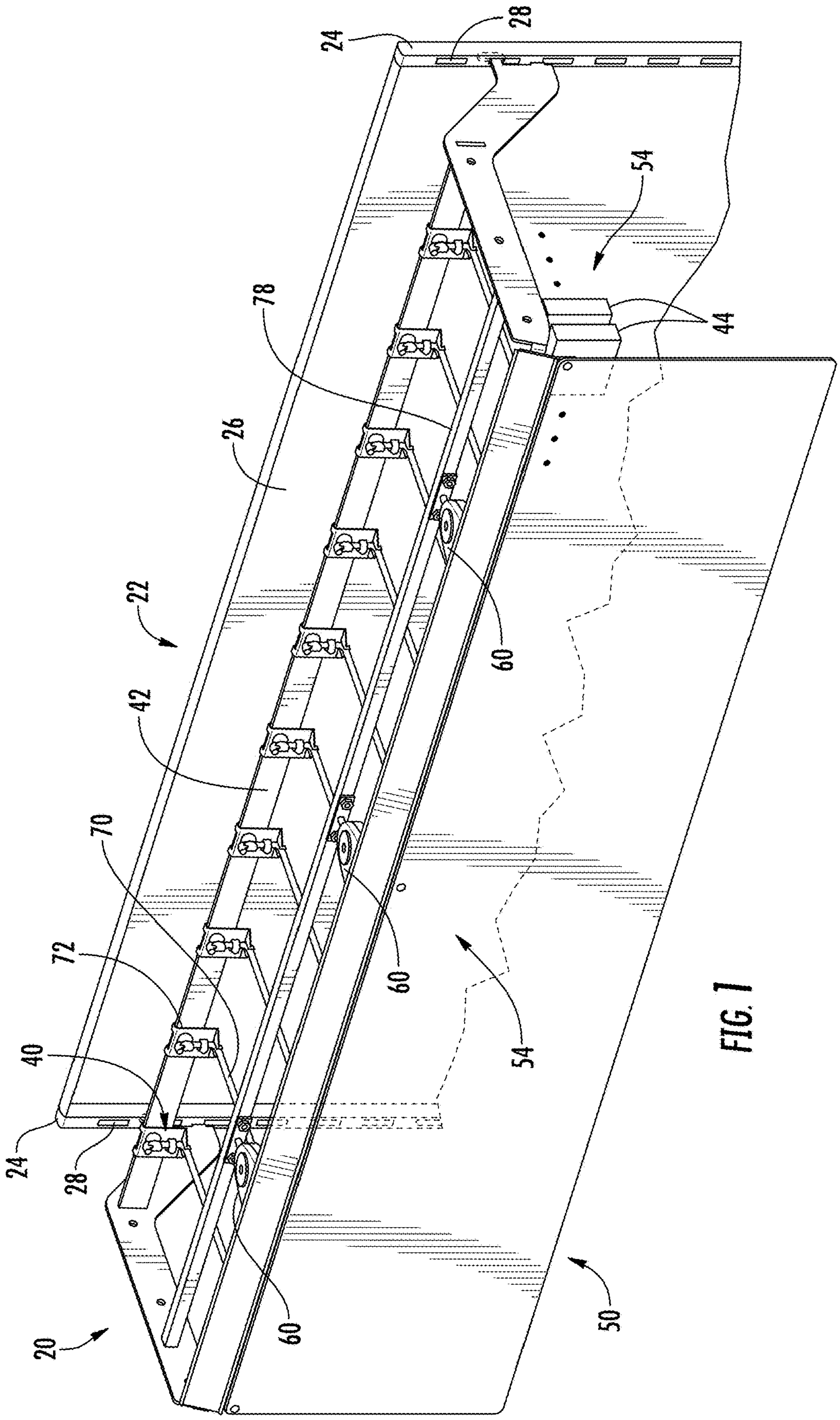
FIG. 1 is a perspective view of an embodiment of a retail merchandise display device with a security shield, constructed according to the teachings herein, with its shield illustrated in its lowered position.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the same illustrate an exemplary embodiment of a retail merchandise display device 20 (also referred to herein as device 20) constructed according to the teachings herein. Device 20 may be readily mounted to an upright retail merchandise display device support structure such as a gondola display 22 as illustrated. As is readily appreciated by those of skill in the art, such gondola displays 22 incorporate a pair of uprights 24 on opposed ends of a vertical wall 26, which may be a peg board style wall as one non-limiting example. Uprights 24 includes slots 28 or similar features that display 20 mates with to mount the same to display 22. Although a single device 20 is shown mounted to display 22, it will be readily appreciated that multiple devices 20 may be mounted above and below one another, as well as to the left and right of one another on those displays 22 incorporating multiple uprights 24.

Device 20 includes a pair of side supports 30 arranged in an opposed spaced relation to one another. One or more peg hook structures 40 are mounted between side supports 30. Supports 30 have hook 31 (see FIG. 2) or multiple hooks at a distal end thereof for cooperating with slots 28 of gondola display 22 for mounting purposes.

Peg hook structures 40 may be mounted to a peg hook support bar 42 of device 20 as shown. Each peg hook structure 40 includes a hook portion 70, and a mounting portion 72. Hook portion 70 may be embodied as any typical peg hook, and mounting portion 72 may be embodied as any typical mounting bracket or feature for a peg hook.

It is contemplated herein that device 20 may be provided with or without peg hook structures 40. Indeed, an end user may already have peg hook structures, which can mount to peg hook support bar 42, and thus does not need device 20 to be supplied with its own peg hook structures 40. Alternatively, device 20 may be provided with one or more of its own peg hook structures 40, for those end users that do not already have peg hook structures adapted to mount to peg hook support bar 42.

Further, peg hook support bar 42 can be omitted and peg hook structures 40 can mount directly to vertical wall 26 using any typical peg hook mounting configuration. Further yet, peg hook support bar 42 may not be required if the peg hook structures 40 directly mount to vertical wall 26. However, utilizing peg hook support bar 42 provides the advantage of a quick mounting configuration for peg hook structures 40. Indeed, peg hook support bar 42 is configured to receive peg hook structures 40 such that they are laterally slidable thereon. This allows for rapid repositioning of these peg hook structures 40 to accommodate differing sizes of merchandise 44.

Merchandise 44 is arranged in a hanging presentation on each peg hook structure 40. Several items of merchandise 44 are shown for simplicity. As will be readily appreciated, however, each peg hook structure 40 supports its own row of merchandise 44, such that device 20 presents multiple parallel rows of merchandise 44 in a neat and orderly presentation.

A shield 50 is mounted adjacent side supports 30 as shown. Shield 50 is pivotable between a lowered position shown in FIG. 1 and a raised position shown in FIG. 2 and vice versa to selectively allow access to a retail merchandise containment region 52. More particularly, shield 50 is selectively pivotable to allow or prevent user hand access to retail merchandise containment region 52 through an opening 54 as shown. Retail merchandise containment region is that region extending generally outwardly from vertical wall 26, and generally below peg hook structures 40, between side supports 30.

This retail merchandise containment region 52 extends below peg hook structures 40 at least the same length as the length of downward extension of shield 50 shown in FIG. 1. Opening 54 to retail merchandise containment region 52 is the region between side support 30 generally in the same plane as that of shield 50 in its lowered position shown in FIG. 1.

Figure 2:
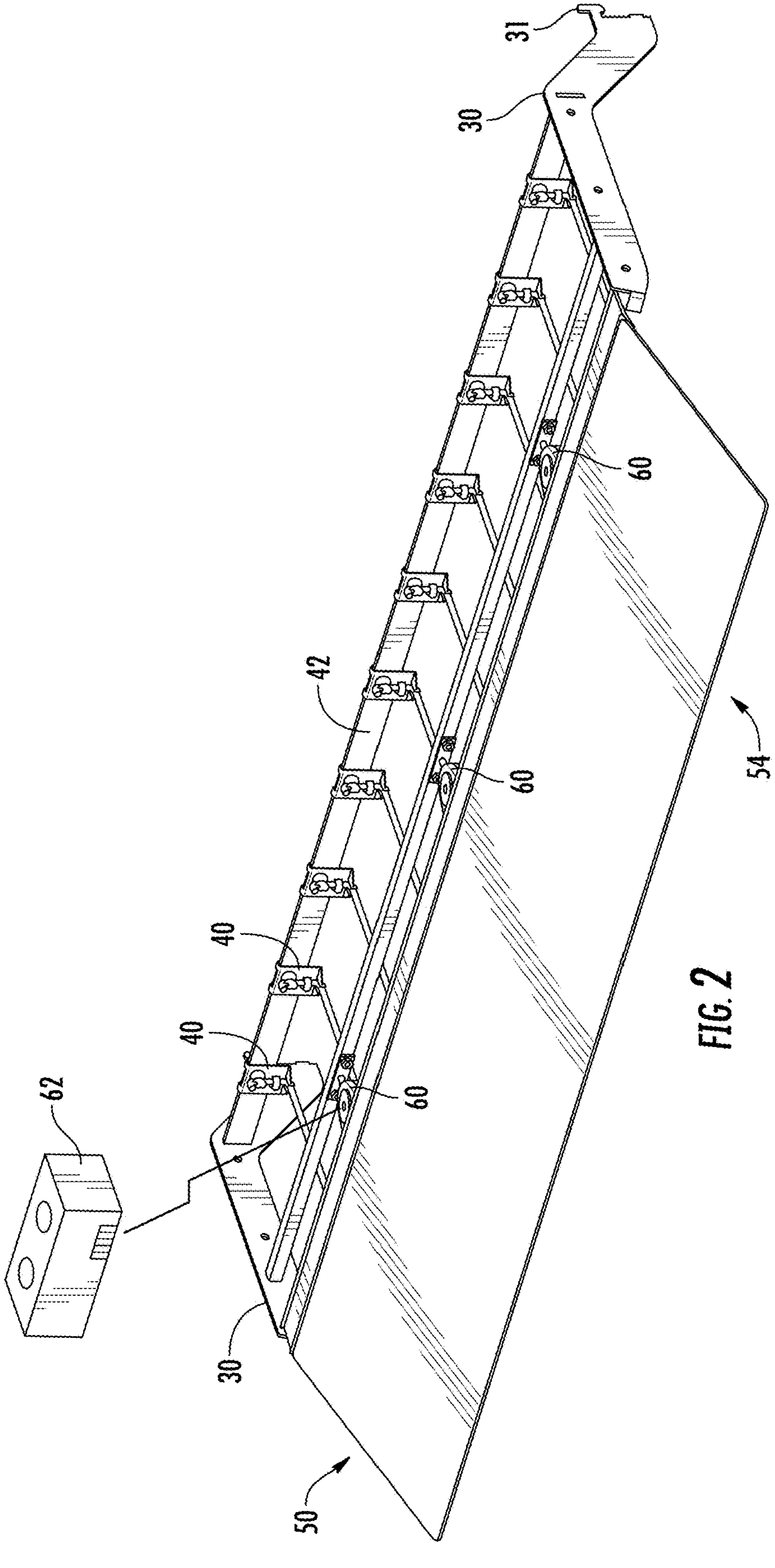
FIG. 2 is a perspective view of the retail merchandise display device of FIG. 1, with the shield illustrated in the raised position.

As may be appreciated from inspection of FIG. 1, shield 50 must be pivoted from its lowered position in FIG. 1 to its raised position shown in FIG. 2 in order for a user to access merchandise 44 hanging from hook structures 44. Shield 50 may be spring biased in addition to gravity biased to the lowered position. As a result, a user must devote one hand to holding shield 50 in the raised position shown in FIG. 2 while simultaneously using their other hand to remove merchandise 44. Such two-handed operation provides its own inherent loss prevention benefit, as it presents a user from using both hands to rapidly remove a large number of merchandise 44 rapidly in a theft tactic referred to as sweeping.

Despite the above loss prevention control measure, device 20 incorporates additional advanced electronic loss prevention control measures. Indeed, device 20 also includes one or more alarm devices 60 (see e.g. FIGS. 3 and 5). In the illustrated embodiment, alarm devices 60 are identical. As such, a description of one alarm device applies equally to the others. These alarm devices 60 may be constructed and function in the same manner as the electronic unit (17, 117) shown and described in U.S. Pat. No. 10,121,341 to Ewing et al. titled "Retail Merchandise Hook With Radio Transmission," the teachings and disclosure of which are incorporated herein in their entirety (hereinafter "Ewing"), which is generally summarized below relative to FIGS. 6-8.

Additionally or in the alternative, alarm devices 60 may be constructed and function in the same manner as the electronic units (17, 117, 217, 317, 517) shown and described in U.S. Pat. No. 9,318,008 to Valiulis et al. titled "Signal Emitting Retail Device," the teachings and disclosure of which are incorporated herein in their entirety (hereinafter "Valiulis"), which is also generally summarized below relative to FIGS. 6-8.

With particular reference to FIG. 2, shield 50 is pivotably mounted to alarm devices 60. As described below, when shield 50 is rotated from the lowered to the raised position, alarm devices 60 detect this movement and produce an alarm signal. This alarm signal may take the form of any type of signal, such as an audible tone or message, a blinking light, or a radio transmission to a remote alarm device 62 which in turn can produce its own local alarm, or any combination thereof.

This local alarm generated by remote alarm device 62 may too be an audible tone or message, a blinking light, or another radio transmission to another device such as a router or a mobile device as non-limiting examples. The radio transmission may be any wireless, e.g. radio frequency, signal. Remote alarm device 62 can be embodied as any device capable of receiving a wireless signal and producing a corresponding alarm signal. As such, it is contemplated that remote alarm device 62 includes all the necessary hardware, firmware, and/or software to achieve such functionality.

The alarm signal produced by alarm devices 60 may occur immediately upon movement of shield 50 from the lowed position to the raised position or when shield 50 reaches its final position in the raised position. Indeed, each alarm device 60 may be configured to produce the alarm signal immediately upon movement, at an end of travel of shield 50 or after a predetermined amount of travel of shield 50 that may be less than full travel. Further, alarm devices 60 may be configured to produce the alarm signal immediately upon one of aforementioned conditions occurring, or alternatively, after a predetermined period of time of the condition occurring. All of the aforementioned functionality may equally occur when shield 50 moves from the raised position back to the lowered position. Although three alarm devices 60 are shown, fewer or a greater number of alarm devices 60 may be utilized.

Figure 3:
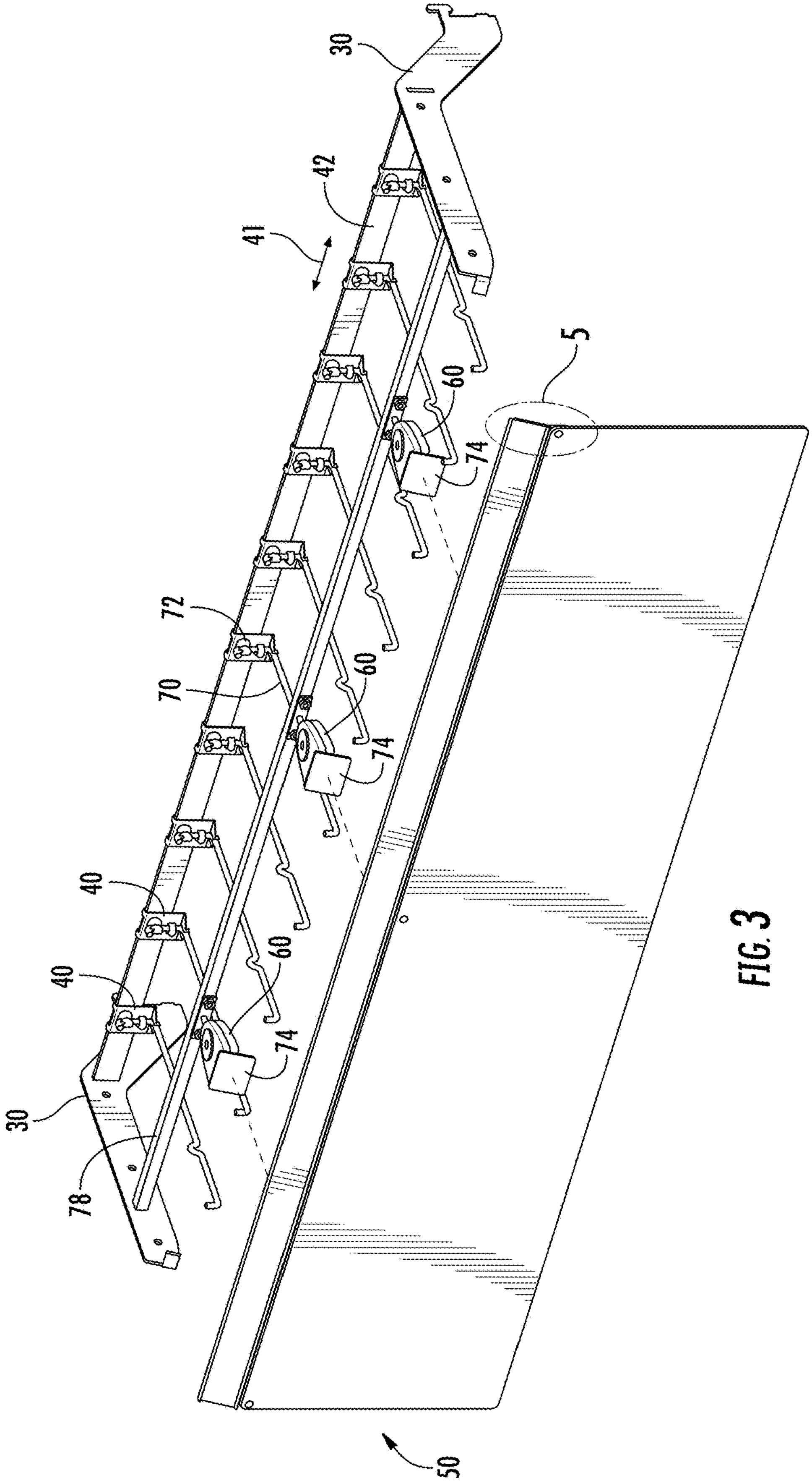
FIG. 3 is a perspective exploded view of the retail merchandise display device of FIG. 1.

Turning now to FIG. 3, alarm devices 60 may be embodied as any device capable of detecting movement of shield 50, and producing a corresponding signal upon such movement. To achieve this end, each alarm device 60 includes a pivotable mounting plate 74 to which shield 50 is attached. Shield 50 may attach to mounting plates 74 via mechanical fasteners, adhesives, or any other means of attachment. Alarm device 60 detects movement of its mounting plate 74 by way of an internal switch operably directly or indirectly acted upon by mounting plate 74, and hence detects movement of shield 50.

Figure 4:
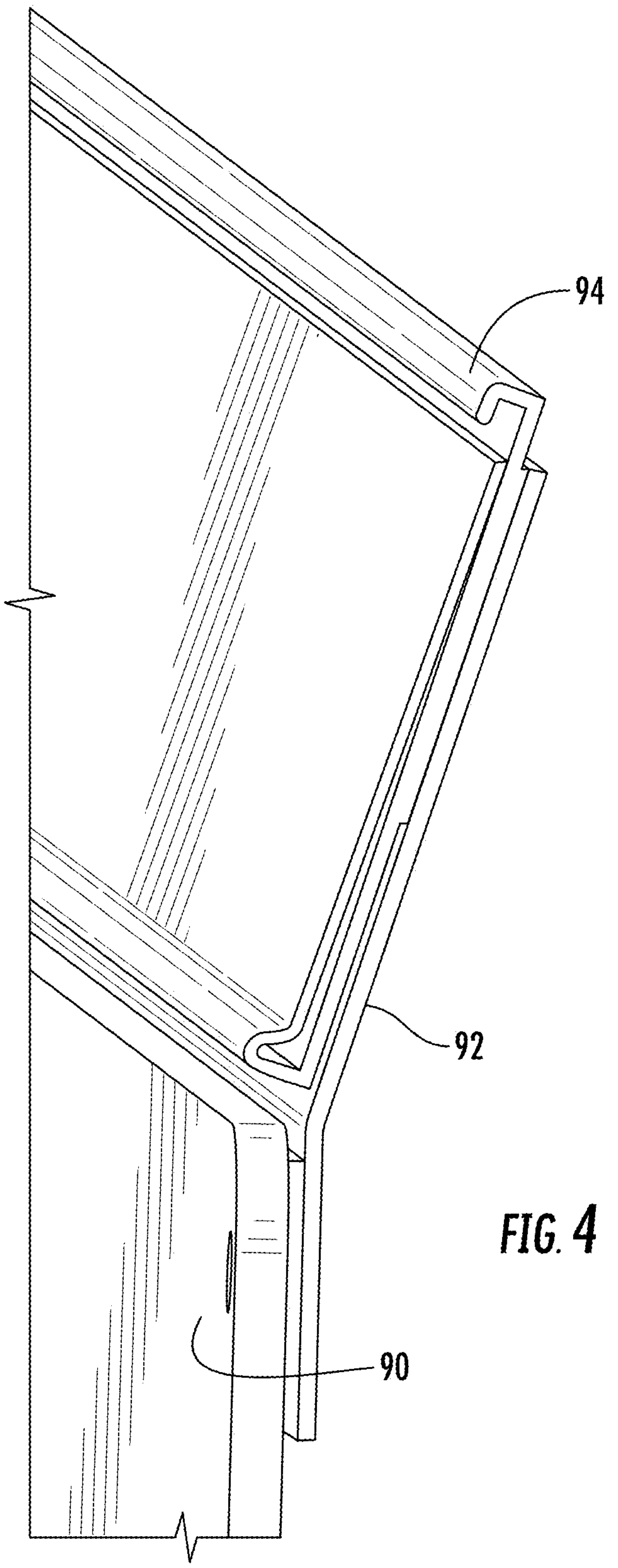
FIG. 4 is a partial perspective view of the shield of the retail merchandise display device of FIG. 1.

With reference to FIG. 4, shield 50 may be a one piece component, or may include a shield member 90 attached by any mechanical means to a backing member 92. A price channel 94 may also be attached to either or both of shield member 90 or backing member 92 by any mechanical means. In the illustrated embodiment, backing member 92 includes a generally smooth rear surface so that it may be readily attached to mounting plates 74 via adhesives or an adhesive tape. Alternatively, mounting plates 74 and backing member could for non-limiting example include mating clip elements for clipping backing member 92 to shield. Still further, shield 50 could be attached to each mounting plate 74 via fasteners or the like. Still further, although shield 50 is shown mounted to alarm devices 60, it could also be pivotably mounted to side supports 30 for additional support.

Figure 5:
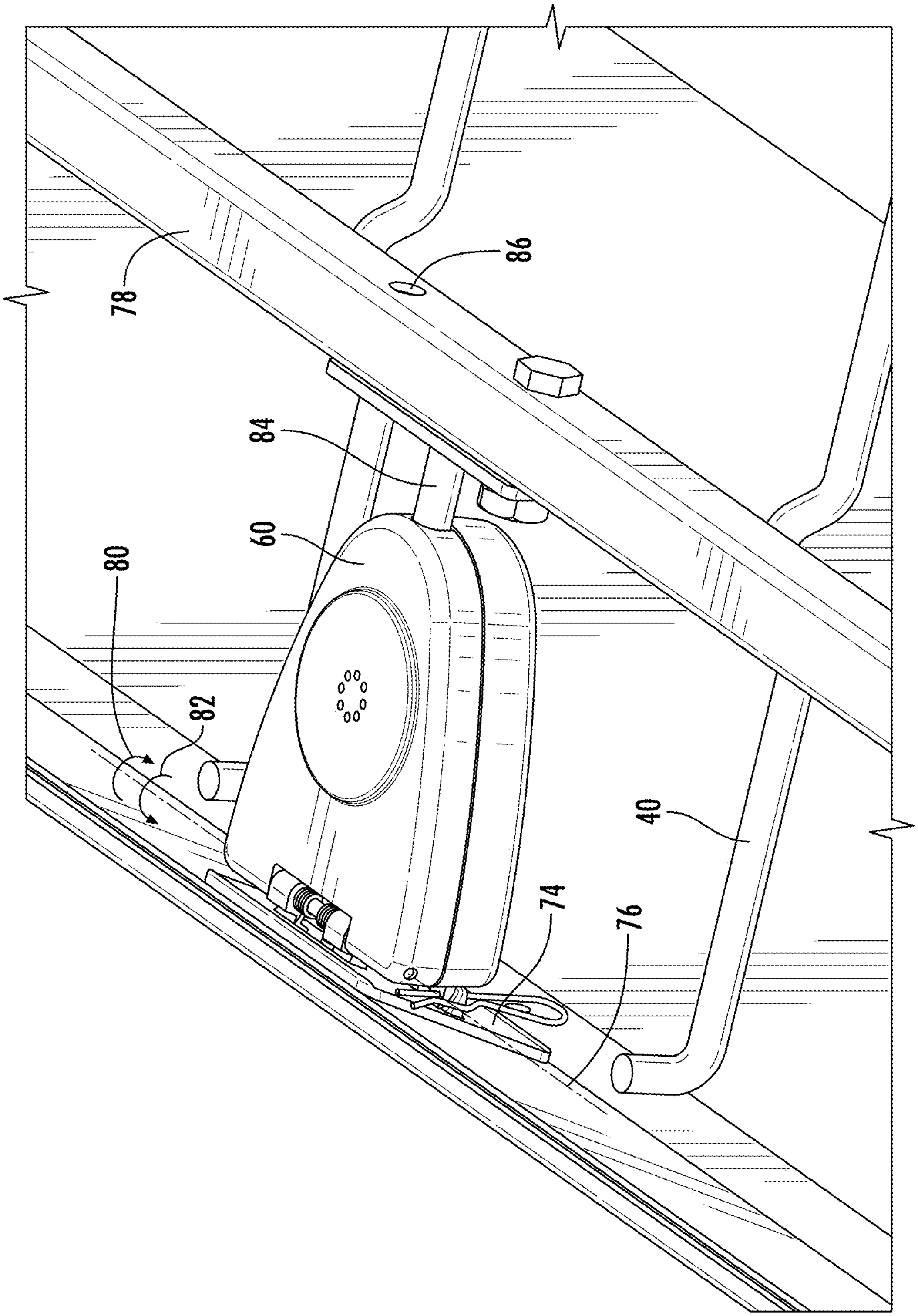
FIG. 5 is a partial perspective view of an alarm device of the retail merchandise display device of FIG. 1.

Turning now to FIG. 5, alarm device 60 is shown in greater detail. Mounting plate 74 is rotatable about an axis 76 defined by alarm device 60 in directions 80, 82 as shown. Alarm device 60 includes an internal switch such as a rotation sensor operatively connected to, or in proximity with, mounting plate 74 so as to detect rotation thereof.

With reference to FIGS. 3 and 5, the alarm devices 60 are mounted to an alarm support bar 78. The alarm support bar 78 extends laterally between and is mounted to side supports 30. The alarm devices 60, in this embodiment, are mounted in a cantilevered orientation relative to alarm support bar 78.

The alarm support bar 78 is mounted vertically offset from, and typically vertically above, the peg hooks 40 so that the alarm support bar 78 and alarm devices 60 do not interfere with, when desired, loading and removing product relative to peg hooks 40. Further, in this configuration, the alarm devices 60 do not interfere with the lateral positioning of the peg hooks 40 (illustrated schematically by arrow 41) relative to peg hook support bar 42.

Figure 6:
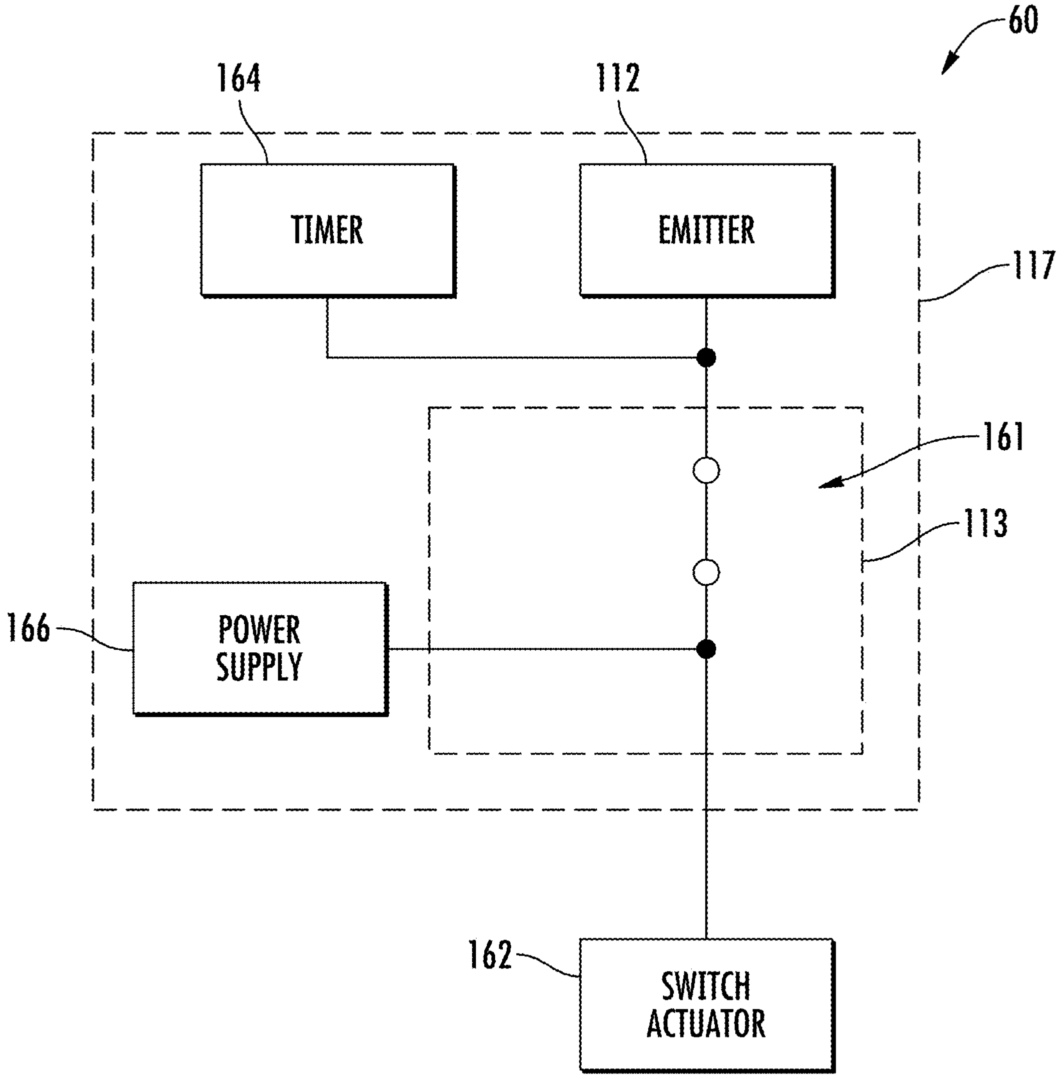
FIG. 6 is schematic representation of components of the signal-emitting retail device of FIGS. 2 and 3.

With reference to FIG. 6, an exemplary functional schematic of the internal components of an embodiment of an alarm device 60 is discussed. As discussed above, alarm device may include any componentry necessary to detect movement of its mounting plate, and produce an alarm signal in accordance therewith. Accordingly, the following should be taken as a non-limiting example. Any device capable of detecting movement of shield 50 and producing a corresponding alarm signal is sufficient.

As one example, alarm device 60 includes an emitter 112 and a sensor 113. Sensor 113 includes a switch 161, which is adapted to transition between an open configuration (shown in solid lines) and a closed configuration (shown in dashed lines) upon rotation of mounting plate 74. Switch 161 may include any suitable type of switching device capable of transitioning between at least a first state and a second state. Alternatively, sensor 113 may be embodied as any other type of motion detection sensor, e.g. light sensor, Hall Effect sensor, etc. Emitter 112 may be a speaker, a light, an antenna for transmitting the aforementioned radio signal. Additionally, alarm device 60 may also include a programmable controller, or any other hardware, software, or firmware necessary for producing the aforementioned alarm signal.

With further reference to FIG. 6, in one embodiment alarm device 60 also includes a power supply 166. Power supply 166 may be any suitable type of battery, a solar power collector, or any other type of power supply. Power supply 166 may be internal or external to alarm device 60, and may be any suitable type of power supply.

In one embodiment, emitter 112 produces an alarm signal upon opening or closing of switch 161 due to movement of a switch actuator 162 which in the illustrated embodiment is mounting plate 74. It also conceived that alarm device 60 can also include a timer 164, which is electrically coupled with emitter 112. Timer 164 is also electrically coupled with power supply 166 through switch 161 when switch 161 is in its closed configuration.

Timer 164 is configured to determine, keep track of, etc. the amount of time between when switch 161 closes and when switch 161 opens. If timer 164 measures an amount of time that is less than a predetermined amount of time, emitter 112 emits a signal indicative of a normal condition of a piece of merchandise 44 being removed from device 20, or emits no signal at all. However, if the amount of time measured by the timer 164 exceeds the predetermined amount of time, the emitter 112 emits the aforementioned alarm signal. The predetermined amount of time may be adjusted and set to a greater or lesser amount of time by a user.

In another embodiment, with further reference to FIG. 6, upon closing of the switch 161, the emitter 112 is configured to emit a signal indicative of a normal condition of removal of a piece of merchandise and the timer 164 is configured to begin timing. If the timer 164 exceeds the preset time before the switch 161 is opened, the emitter 112 emits a signal indicative of a potential theft condition.

As an example, emitter 112, in addition to transmitting a radio signal to remote alarm device 62, alarm box 50, may be configured to emit an audible tone. In this embodiment, the audible tone may be of a different pitch, frequency, decibel level, wavelength, frequency of occurrence, etc. than the signal indicative of a normal condition in which a piece of merchandise 44 is removed. For example, a normal condition may be that shield 50 is only in the raised position for a relatively small amount of time, or is transitioned to the raised position infrequently during a predetermined period of time. Under such normal conditions, alarm device 60 may not produce any type of alert, or in the alternative may for non-limiting example provide a single momentary beep. However, if shield 50 remains in the raised position for an extended period of time, or is transitioned multiple times in quick succession, alarm device 60 then produces the alarm signal.

Figure 7:
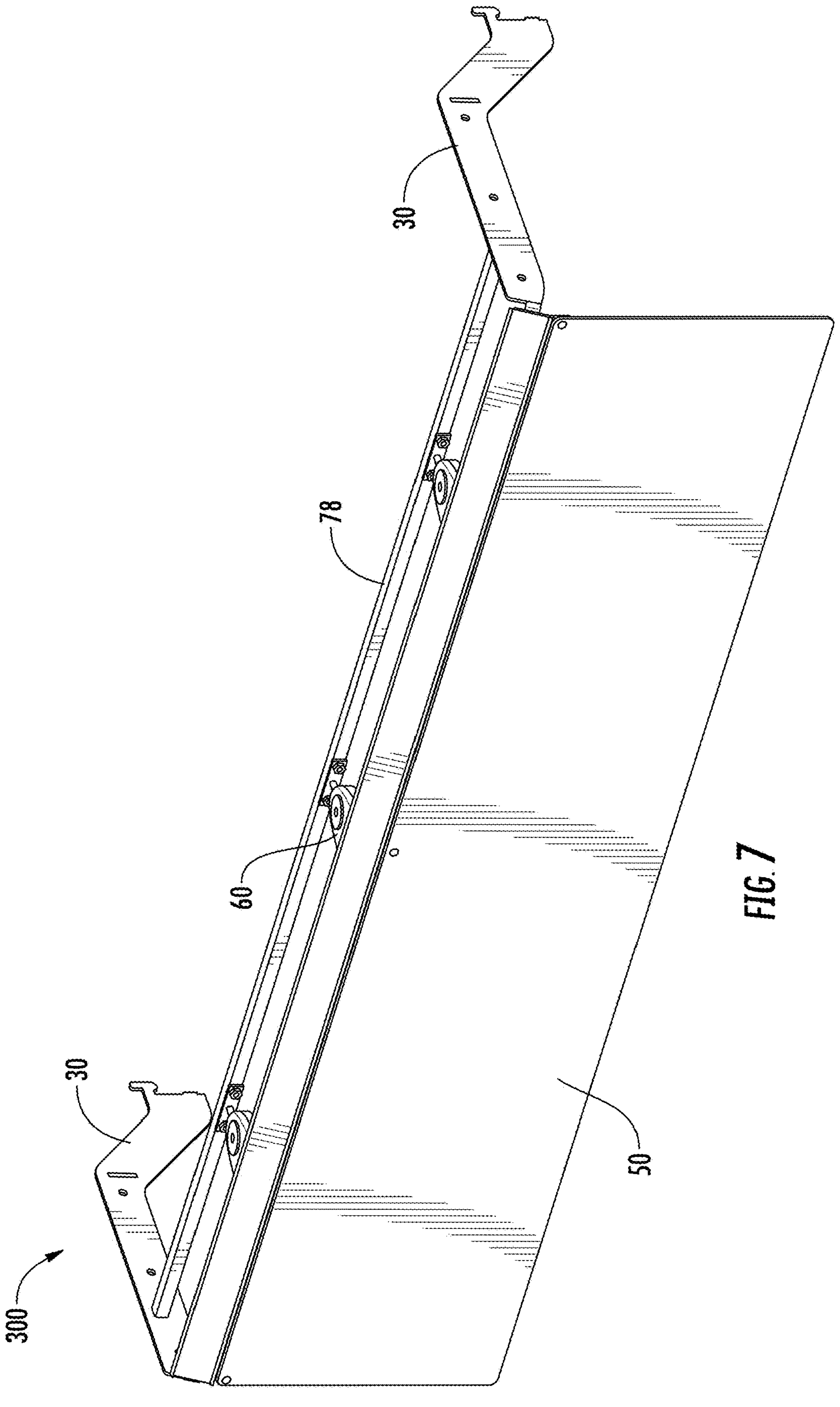
FIG. 7 is a perspective illustration of a security device.
Figure 8:
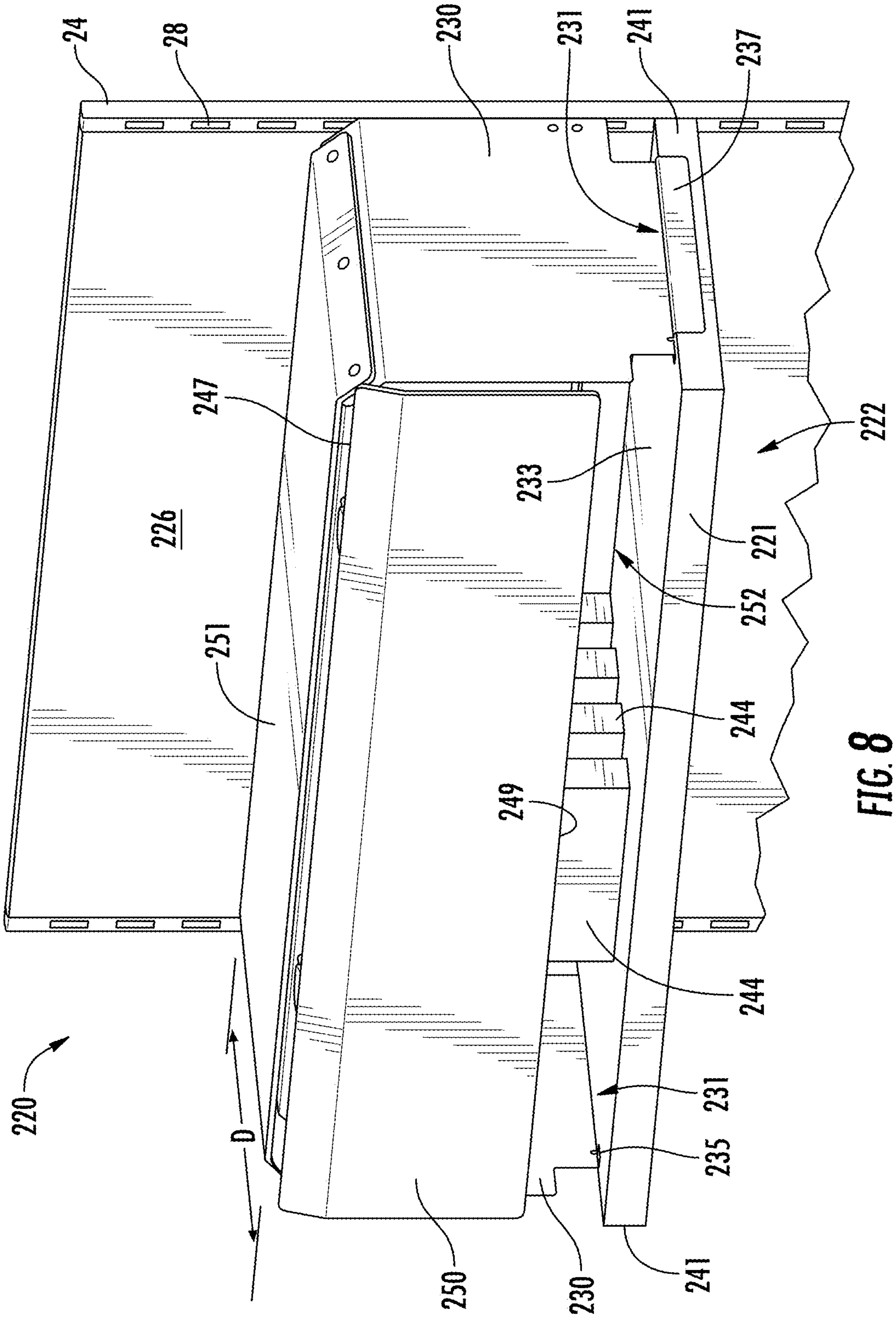
FIG. 8 is a perspective view of an embodiment of a retail merchandise display device with a security shield, with the shield in a lowered position and for use with a shelf.

With reference to FIG. 7, the shield 50, side supports 30 and alarm devices 60 may be combined as a separate security device 300 separate and apart from the peg hooks 40 and associated peg hook support bar 42. Thus, in one embodiment, an existing gondola display can be retrofit with the security device. In such a security device, the alarm support bar 78 may also be provided. As such, the security device 300 could be provided as a completed security system that simply needs to be mounted to gondola display 22. This can be done even with existing peg hooks and merchandise in place.

With reference to FIGS. 8-12, an alternative retail merchandise display device 220 (also referred to herein as "device 220") is illustrated. The device 220 finds particular use with a shelf display 222 as opposed to the gondola display 22 of the prior device 20.

In this device 220, shelves 221 support the merchandise 244. The shelves 221 may be supported by/attached to uprights 24 and slots 28 thereof, much like side supports 30 of the prior device 20. As such, the shelves 221 can include hooks that cooperate with slots 28 for mounting purposes.

The retail merchandise display device 220 includes a pair of side supports in the form of side panels 230, a shield 250 and a top panel 251. Device 220 is, thus intended to be used on a top shelf where no other object blocks access to the retail merchandise containment region 252 from the top. In the prior device 22, the peg hooks themselves prevented vertical removal of the merchandise.

In a preferred implementation, the top panel 251 extends at least 80 percent of the distance D between the top edge of 247 of the front shield 250 and the rear wall 226 when the shield 250 is in the down position and more preferably at least 90 percent of the distance D.

Figure 9:
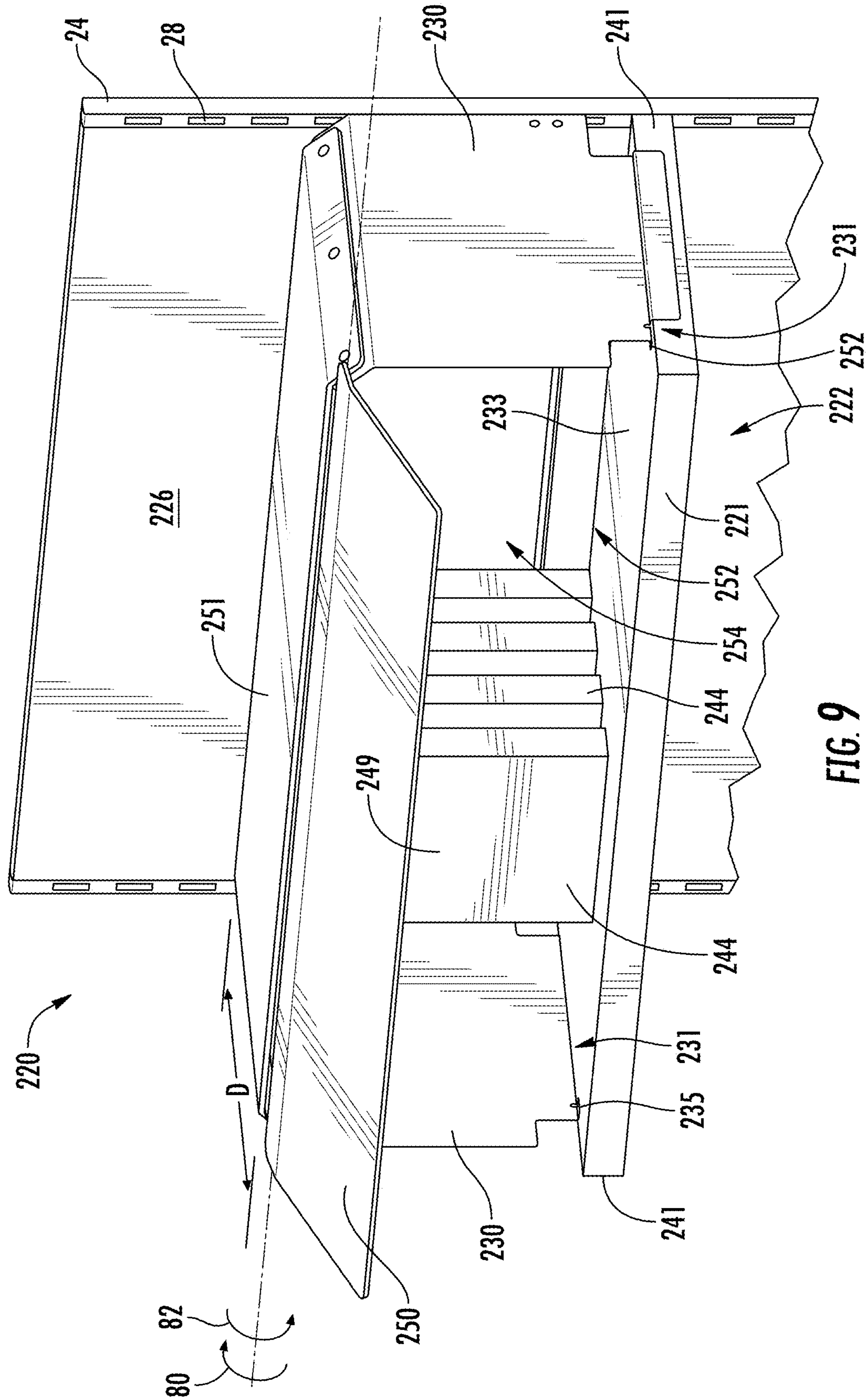
FIG. 9 is perspective illustration of the retail merchandise display device with the shield in a raised position.

Like the prior design, shield 250 is selectively pivotable to allow or prevent user hand access to retail merchandise containment region 252 through an opening 254 as shown in FIG. 9. Retail merchandise containment region 252 is that region extending generally outwardly from vertical wall 226, and generally below top panel 251, and laterally between side panels 230 (e.g. the region above shelf 221 and below top panel 251). Here opening 254 is more easily visualized to the larger extent of side panels 230

The side panels 230 an outward extending stepped region 231 that rests on the top surface 233 (e.g. merchandise support surface) of shelf 221. Inward extending tabs 235 also help vertically support the device 220 when mounted on shelf 221. In some implementations, the tabs 235 may have holes for receipt of fasteners such as screws, pins, bolts, etc. for engaging cooperating holes in the top surface 233 of shelf 221.

Figure 13:
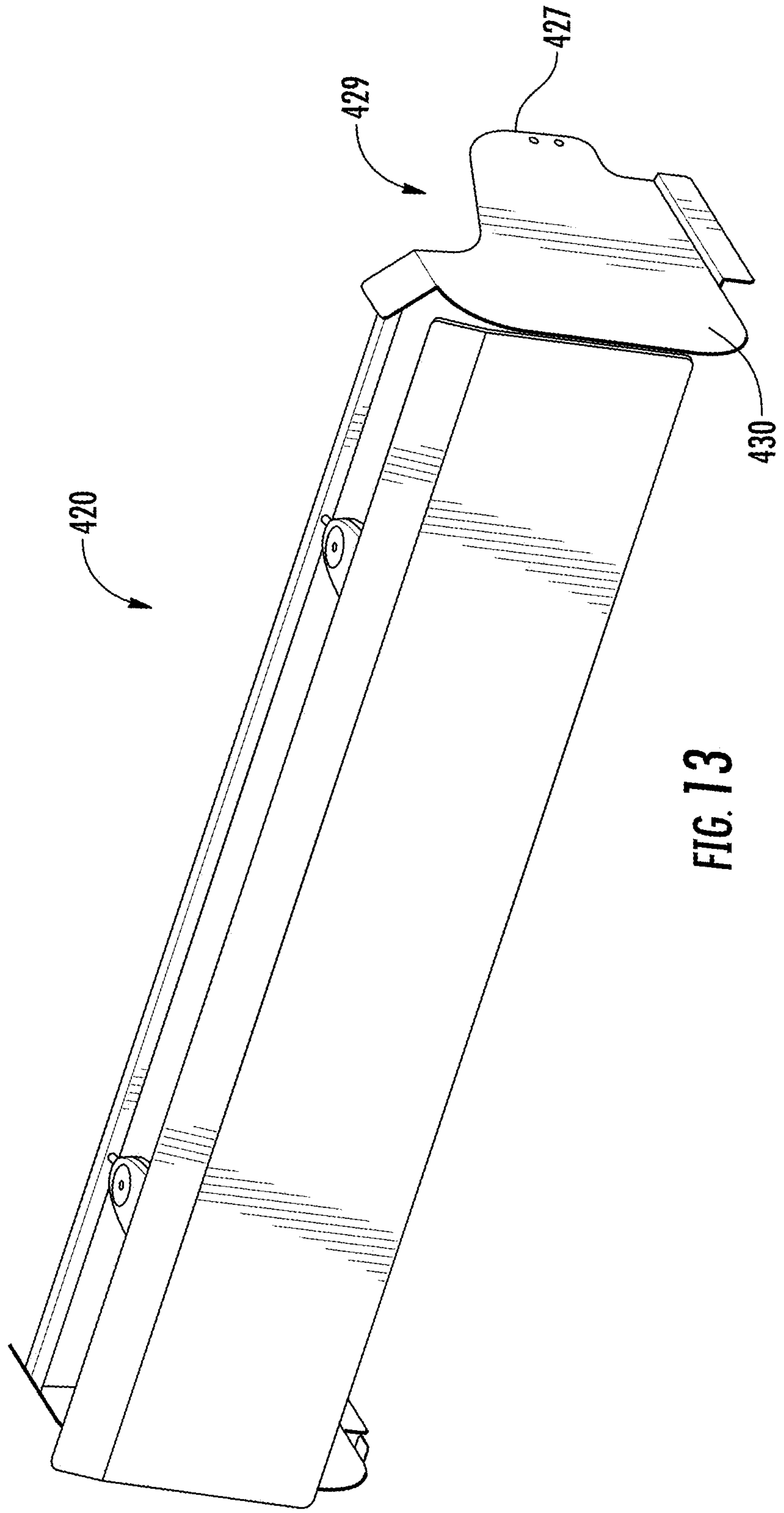
FIG. 13 is a perspective illustration of a further retail merchandise display device for use with a shelf and with the shield in a lowered position.

With additional reference to FIG. 13, each side panel 230 includes a downward extending alignment flange 237 that extends downward from stepped region 231. The alignment flanges 237 extend over ends 241 of the shelf 221 with the shelf 221 positioned laterally therebetween. Thus, the alignment flanges 237 laterally position the device 220 relative to the shelf 221 and prevent lateral movement relative to shelf 221. The tabs 235 and corresponding fasteners can help with similar alignment and prohibition of lateral movement.

In a preferred implementation, the vertical height of the side panels 230 is greater than or equal to the vertical height of the shield 250 when shield 250 is in the lowered position. Further yet, it is preferred that the bottom edge 249 of the shield 250 is vertically above the stepped region 231 of the side panels 230 so that the front shield 250 does not interfere with mounting the device 220 at any position between the front and rear of shelf 231. Otherwise, in other implementations, the front shield 250 may, when in the down position, overlap the front face of shelf 221. As such, in a preferred implementation, the bottom edge 249 is vertically spaced above the top surface 233 of shelf 221 when in the down position.

In a further preferred implementation, it is preferred that the bottom edge 249 is spaced vertically above the top surface 233 of shelf 221 sufficiently far to allow for visible access to the merchandise 244.

Some implementations may include a gondola hook 245 that can connect the device 220 to a gondola display and particularly the uprights 24 and slots 28. The connection to the uprights 24 could, in some embodiments, fully vertically support device 220. In other implementations, the connection to uprights 24 via hook 245 is to prevent forward movement of the device 220 relative to shelf 221. More particularly, when properly installed, gondola hook 245 will engage slots 28 uprights 24 via slots 28 and prevent the device 220 from being removed from the shelf by pulling the device 220 away from the rear wall.

Figure 10:
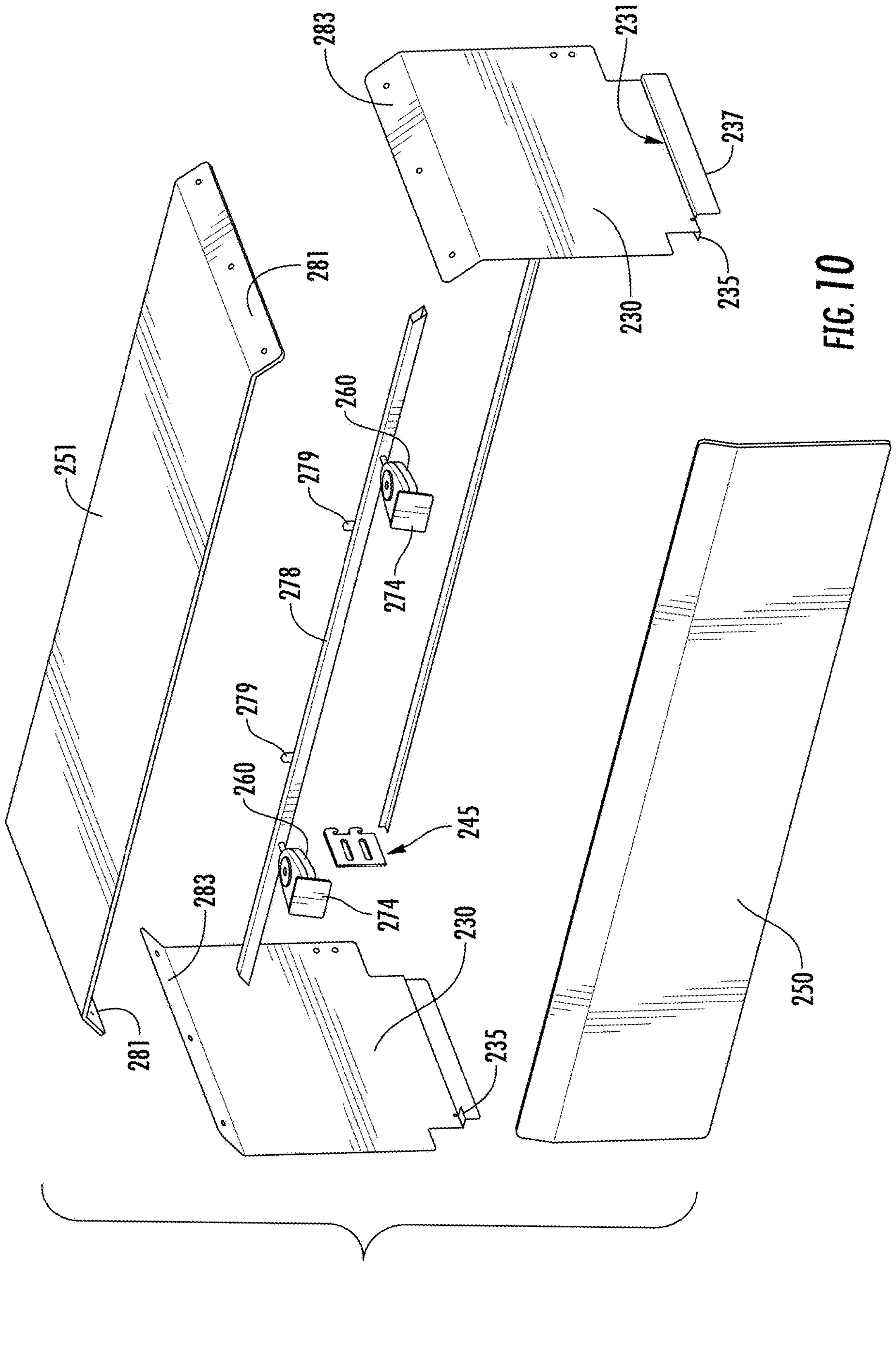
FIG. 10 is an exploded perspective illustration of the device of FIG. 9.

The gondola hook 245 may be integrally formed with side panels 230 or could be formed from a separate component operably attached to side panels 230, as illustrated in FIG. 10. By being a separately attached component, the position of the gondola hook 245 relative to the rest of device 220 can be adjusted. This can be used, in particular, for improved positioning of gondola hook 245 for engagement with upright 24.

An alarm support bar 278 extends laterally between side panels 230 and supports alarm devices 260. These alarm devices 260 cooperate with and support front shield 250 in a same manner as in the prior embodiment. For example, alarm device 260 includes mounting plates 274 that operate and are connected in the same way as mounting plates 74 discussed previously.

In this embodiment, the alarm support bar 278 includes spacer tabs 279 that extend upward. These spacer tabs 279 support the top panel 251 and prevent sagging thereof.

The lateral ends 281 of top panel 251 and the top ends 283 of the side panels 230 are tapered via bends. The tapered arrangement self aligns the top panel 251 relative to the side panels 230 for mounting purposes.

Figure 11:
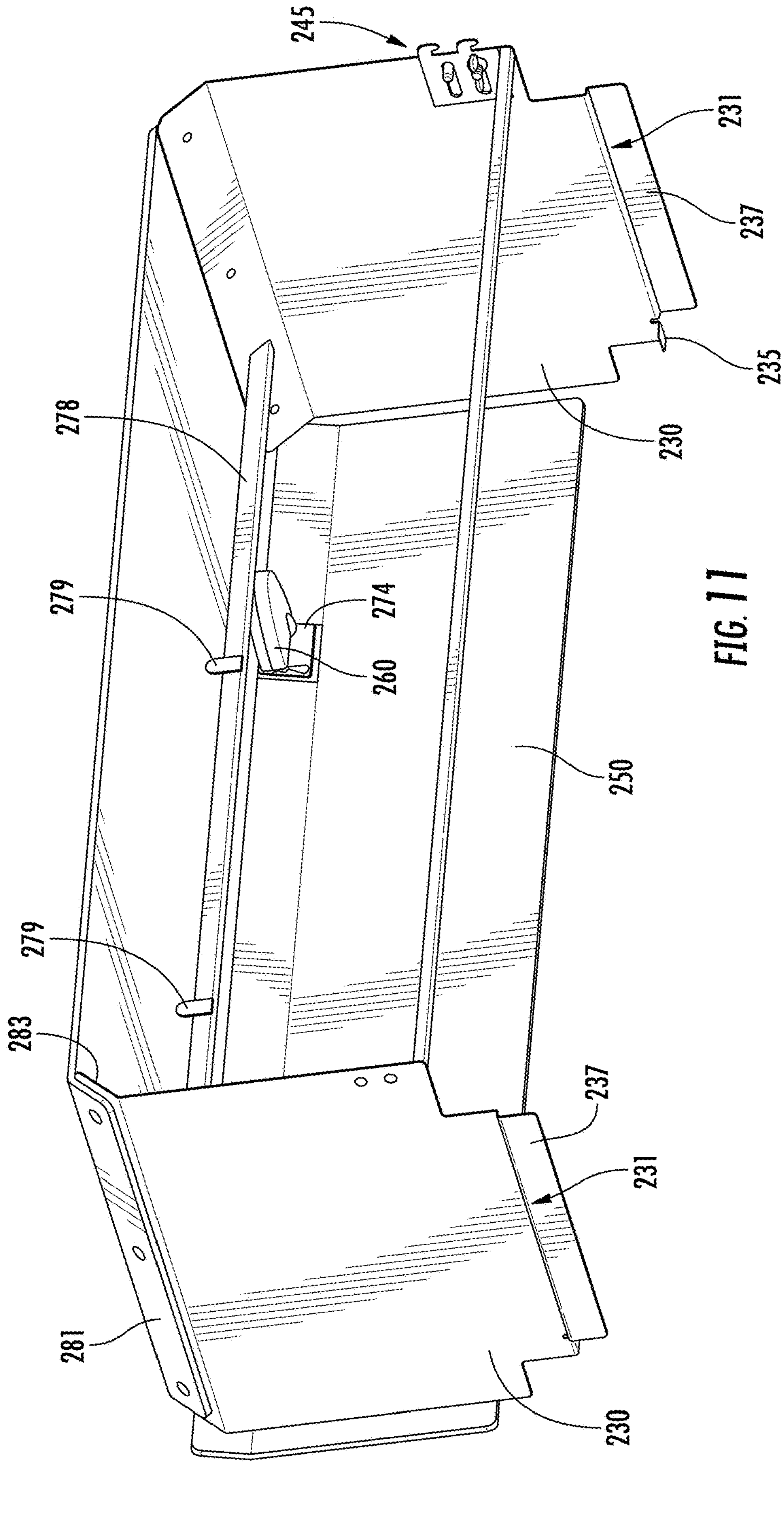
FIG. 11 is a rear perspective view of the device of FIG. 9.
Figure 12:
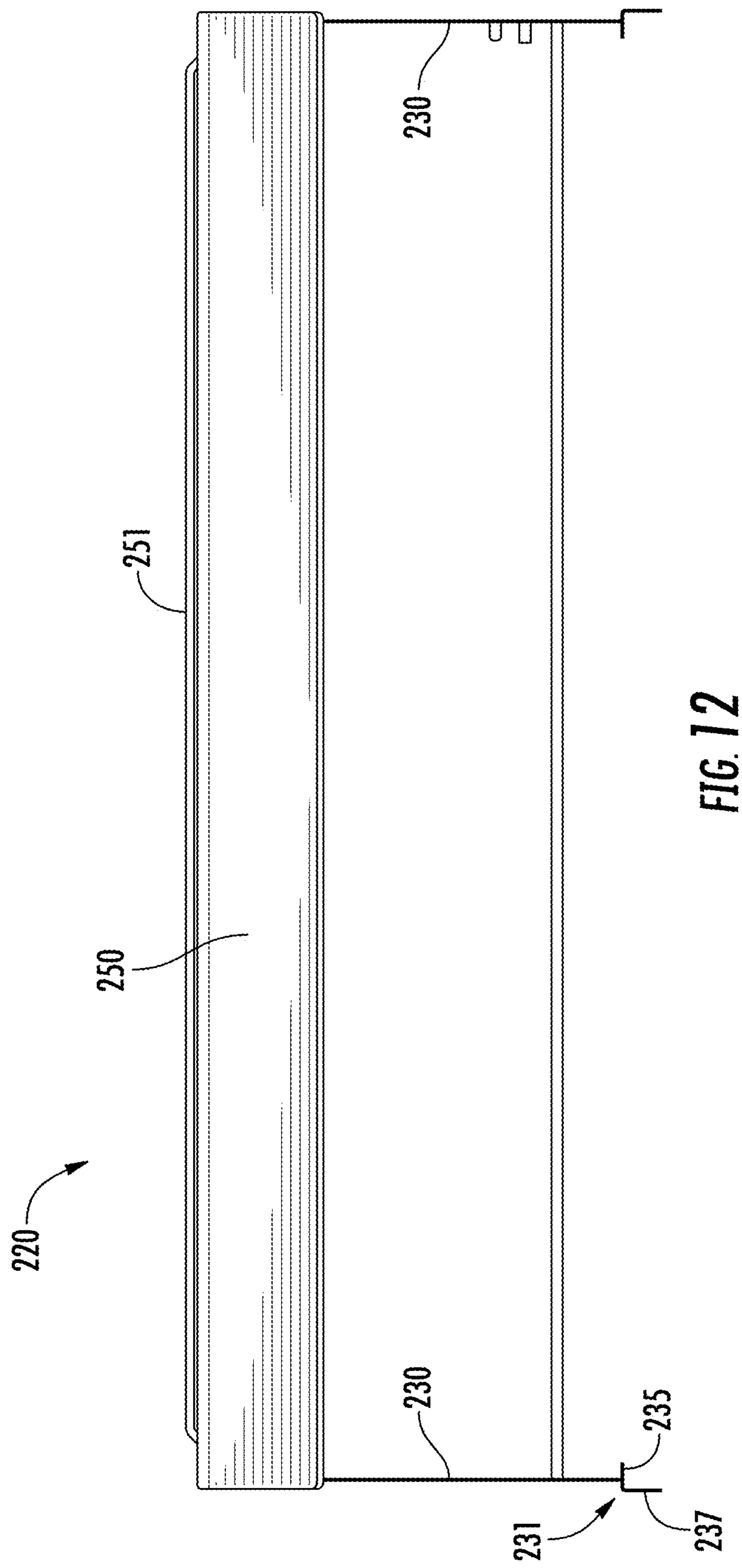
FIG. 12 a rear plan view of the device of FIG. 9.

In some implementations, the unit is in the form of a retrofit security device that includes the side panels 230, alarm devices 260, alarm support bar 278, front shield 250 and top panel 251 as complete unit that can be retrofit mounted to existing shelves. This unit would be that which is illustrated in FIGS. 10 and 11.

Figure 14:
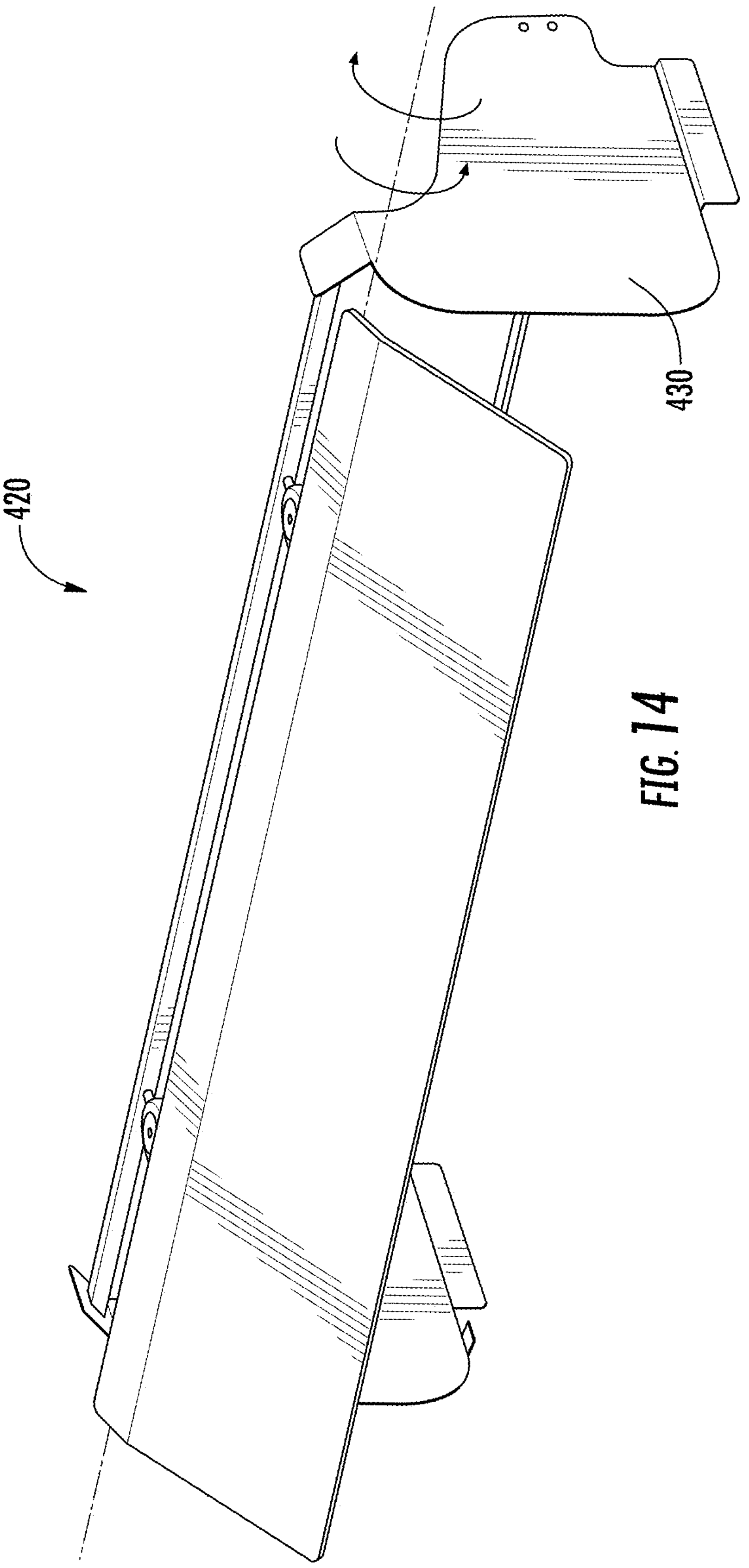
FIG. 14 illustrates the device of FIG. 13 with the shield in a raised position.
Figure 15:
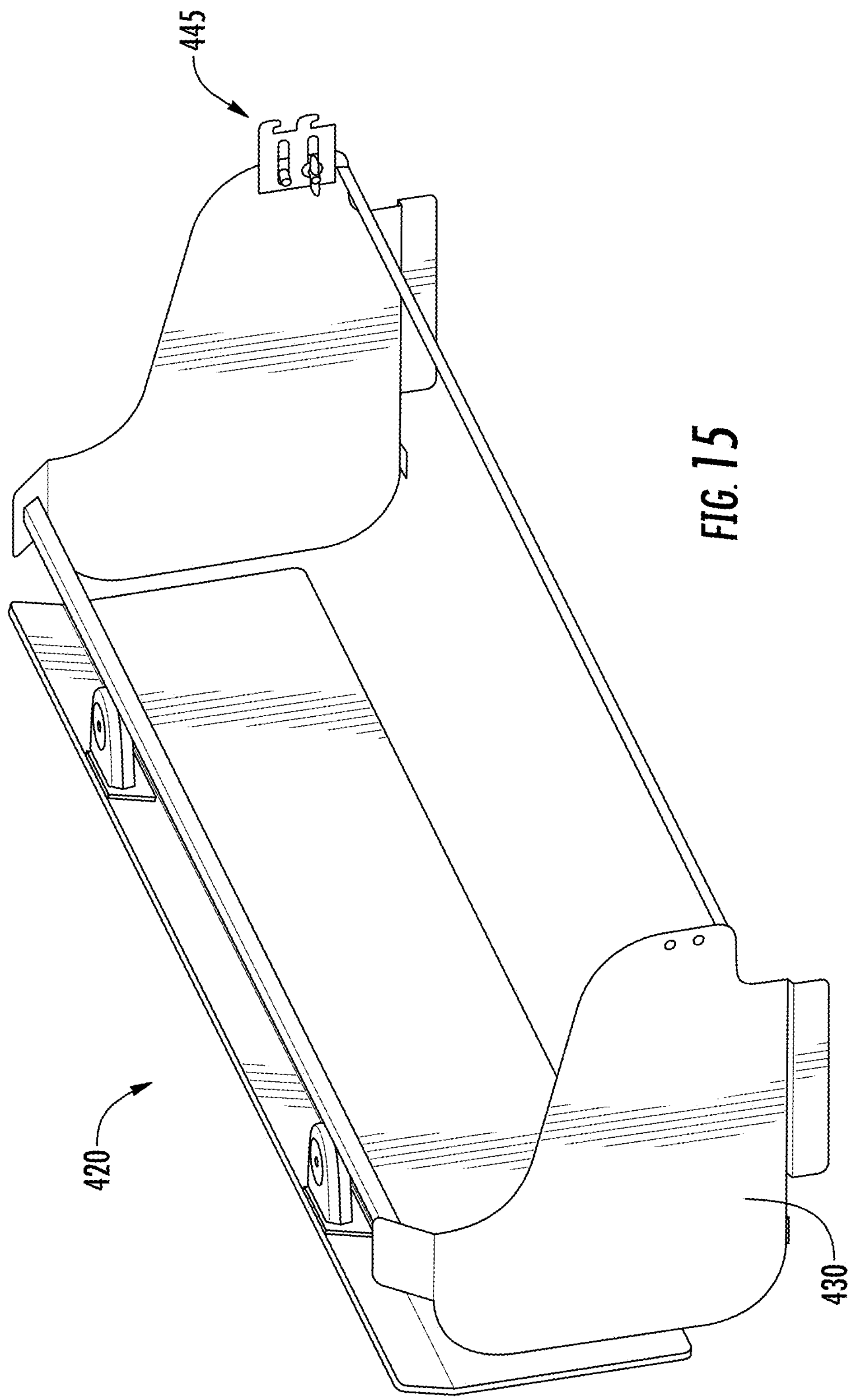
FIG. 15 is a rear perspective view of FIG. 13.
Figure 16:
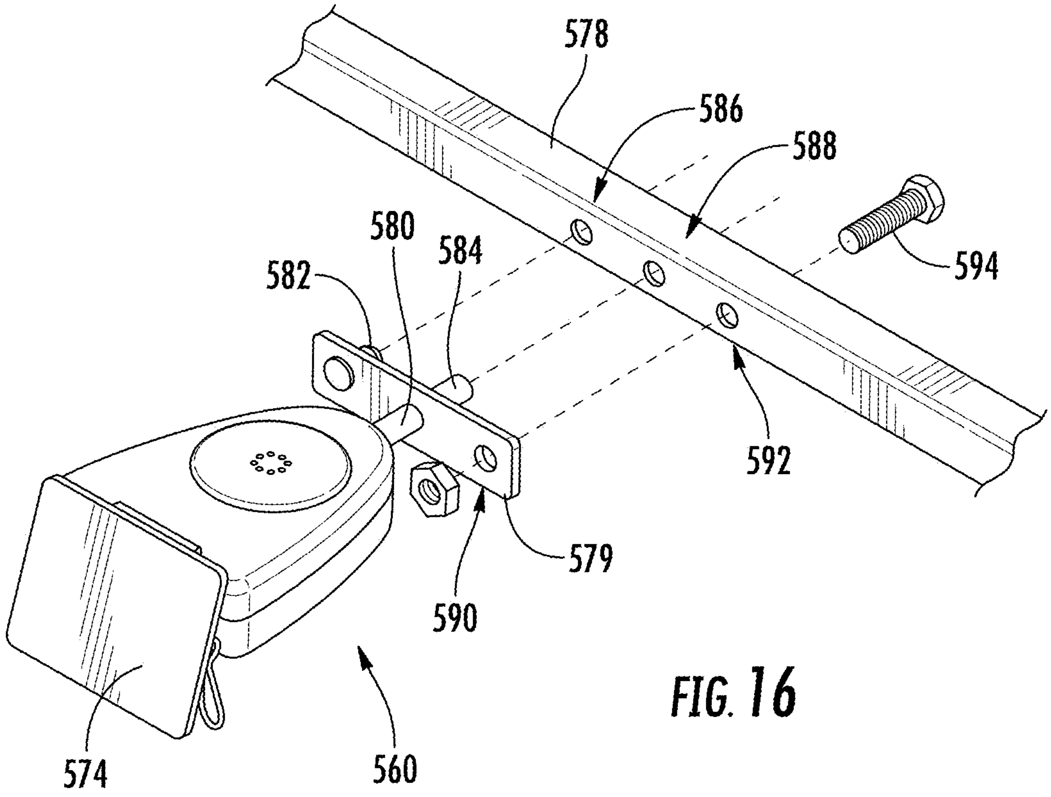
FIG. 16 is a partially exploded perspective view of a security device usable in the systems of the application.

FIGS. 14-16 illustrate a further embodiment of a device 420. This device is substantially the same as device 220 except for some minor differences. Only the differences will be described and all other features previously described for device 220 are considered to be equally applicable to this device 420.

This device 420 is designed to mount on a shelf that has a further shelf mounted above it. In other words, device 420 would be used between two vertically spaced shelves. The device 420 will be mounted to the bottom shelf of the pair of spaced apart shelves. As such, this device 420 does not need a top panel.

The side panels 430 have been modified for use below other shelves. More particularly, side panels 430 have notched regions 429 proximate a rear edge 427. The notched regions 429 are configured to accommodate support members of the shelf immediately above the device 420 when it is in a mounted state.

Otherwise, the device 420 mounts to a shelf and/or gondola display in the same ways as device 420 discussed previously. As such, the side panels 430 are similar as side panels 230 as it relates to mounting features and the device 420 may, optionally, like device 220, include gondola hook 445.

Figure 17:
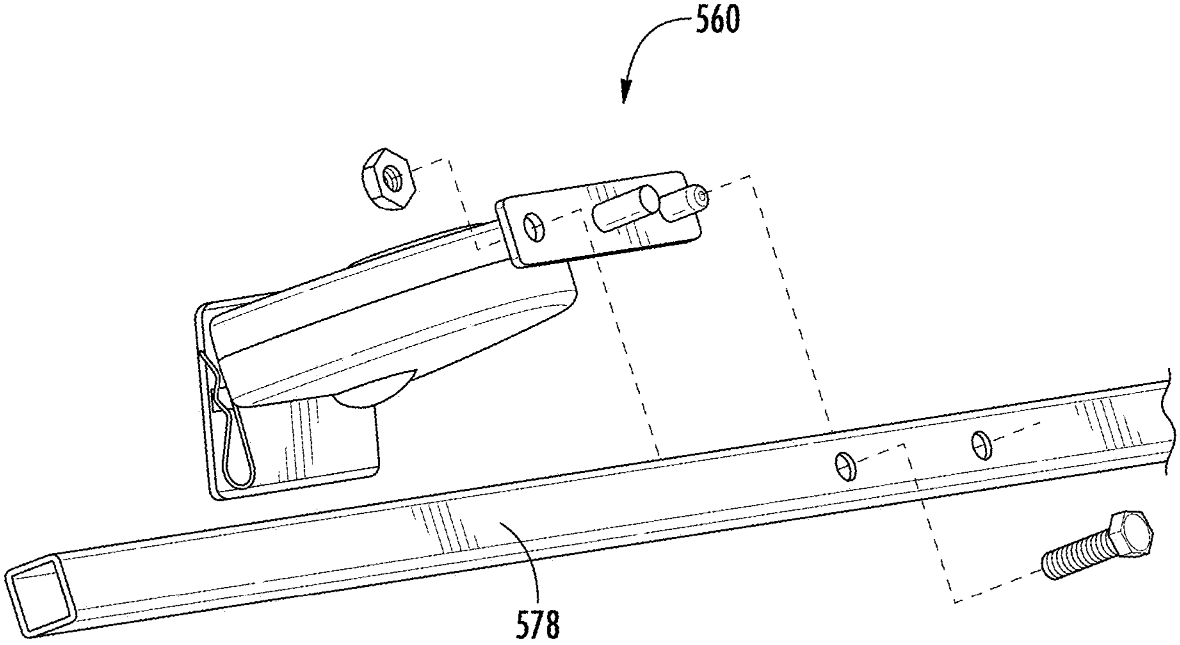
FIG. 17 is a further partially exploded perspective view of the security device of FIG. 16.

FIG. 17 illustrates a particular alarm device 560 attached to alarm support bar 578 that includes all of the alarm features of the alarm device 60 described previously. In this embodiment, the alarm device 560 is removably mounted to alarm support bar 578. This allows for simple replacement of the alarm device for repairs or replacement. For example, if the battery dies within the alarm device 560, the user can simply swap that particular alarm device 560.

The alarm device 560 includes a plurality of mounting features for releasably securing the alarm device 560 to the alarm support bar 578. In this embodiment, the alarm device includes a main body attached to a base plate 579 by a rod 580. The alarm sensing components are located within the main body. The mounting plate 574 is rotatably mounted to the main body.

An alignment projection 582 extends rearward from base plate 579 in parallel to a distal end 584 of rod 580.

The alignment projection 582 and distal end 584 are axially received in corresponding apertures 588 of the alarm support bar 578.

Base plate 579 also includes an aperture 590 that aligns with aperture 592 of alarm support bar 578. A fastener in the form of bolt 594 extends through the aligned apertures 590, 592 to secure the alarm device 560 to the alarm support bar 578.

When such a removable alarm device 560 is used, it is preferred that the shield attached thereto is removably attached. Such an arrangement would typically utilize fasteners such as screws, bolts, snaps or other fasteners to secure the shield to the mounting plate 574.

A retail display system including multiple shelves and security devices similar to devices 220, 420 would likely incorporate device 220 on a top shelf and device 420 on a lower shelf, e.g. a shelf that has another shelf positioned vertically thereabove.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A retail merchandise display device, comprising:

a pair of side supports in opposed spaced relation, the side supports defining an opening between the pair of side supports providing access to a retail merchandise containment region between the pair of side supports;

a shield positioned adjacent the opening, the shield pivotable from a lowered position wherein the retail merchandise containment region is not accessible through the opening, and a raised position wherein the retail merchandise containment region is accessible through the opening;

at least one alarm device arranged to detect at least one of a transition of the shield from the lowered position to the raised position, or a transition from the raised position to the lowered position;

an alarm device support bar positioned between the pair of side supports, wherein the at least one alarm device is mounted to said alarm device support bar a peg hook support bar extending between the pair of side supports, the peg hook support bar extending parallel to said alarm device support bar; and at least one peg hook mounted to the peg hook support bar, the peg hook having a distal free end positioned forward of the alarm device support bar; the distal free end being positioned rearward of the shield when the shield is in the lowered position.

2. The retail merchandise display device of claim 1, wherein each of the pair of opposed side supports are configured to mount to a retail merchandise display device wall as a cantilevered extension.

3. The retail merchandise display device of claim 1, wherein at least one alarm device is configured to produce an alarm signal based on said transitioning of said shield.

4. The retail merchandise display device of claim 3, wherein the alarm signal is at least one of a radio transmission, a flashing light, and an audible tone.

5. The retail merchandise display device of claim 4, further comprising a remote alarm device, the remote alarm device configured to receive the radio transmission from the at least one alarm device, the remote alarm device configured to product a local alarm.

6. The retail merchandise display device of claim 3, wherein the at least one alarm device is configured to produce the alarm signal after the shield has remained in the raised position for a predetermined period of time.

7. The retail merchandise display device of claim 3, wherein the at least one alarm device is configured to produce the alarm signal upon completion of said transitioning from the lowered position to the raised position or upon completion of said transitioning from the raised position to the lowered position.

8. The retail merchandise display device of claim 1, wherein:

the peg hook support bar is located rearward of the alarm device support bar;

the peg hook has a first portion rearward of the alarm device support bar and a second portion forward of the alarm device support bar; and the peg hook has an intermediate portion positioned between the first portion and the second portion, the intermediate portion being positioned vertically below the alarm device support bar.

9. The retail merchandise display device of claim 1, wherein the side supports are side panels that extend vertically below a bottom edge of the shield when the shield is in the lowered position.

10. The retail merchandise display device of claim 1, further comprising a shelf defining a merchandise support surface upon which the merchandise is vertically supported, the shelf vertically supporting the pair of side supports.

11. A retail merchandise display device, comprising:

a pair of side supports in opposed spaced relation, the side supports defining an opening between the pair of side supports providing access to a retail merchandise containment region between the pair of side supports;

a shield positioned adjacent the opening, the shield pivotable from a lowered position wherein the retail merchandise containment region is not accessible through the opening, and a raised position wherein the retail merchandise containment region is accessible through the opening;

at least one alarm device arranged to detect at least one of a transition of the shield from the lowered position to the raised position, or a transition from the raised position to the lowered position;

a shelf defining a merchandise support surface upon which the merchandise is vertically supported, the shelf vertically supporting the pair of side supports;

an alarm device support bar positioned between the pair of side supports, wherein the at least one alarm device is mounted to said alarm device support bar;

wherein:

the pair of side supports are side panels;

each side panel includes a lateral stepped region, the lateral stepped region being in contact with the shelf and extending laterally outward from the corresponding side panel;

each side panel includes a downward extending alignment flange that extends downward from the lateral stepped region;

the shelf extending laterally between first and second ends;

the downward extending alignment flange of one side panel extending over the first end and the downward extending alignment flange of the other side panel extending over the second end such that the shelf is positioned laterally between the downward extending alignment flanges.

12. A retail merchandise display device, comprising:

a pair of side supports in opposed spaced relation, the side supports defining an opening between the pair of side supports providing access to a retail merchandise containment region between the pair of side supports;

a shield positioned adjacent the opening, the shield pivotable from a lowered position wherein the retail merchandise containment region is not accessible through the opening, and a raised position wherein the retail merchandise containment region is accessible through the opening;

at least one alarm device arranged to detect at least one of a transition of the shield from the lowered position to the raised position, or a transition from the raised position to the lowered position;

an alarm device support bar positioned between the pair of side supports, wherein the at least one alarm device is mounted to said alarm device support bar;

wherein:

the side supports are side panels that extend vertically below a bottom edge of the shield when the shield is in the lowered position;

each side panel has a top edge that has a first region having a first vertical height and a second region having a reduced vertical height relative to the first vertical height, the first region being positioned between the second region and the shield, the second region being proximate a rear end of the side panel, the first and second regions defining a notched region in the top edge;

the alarm device support bar is attached to the side panels proximate forward of the notched regions.

13. A retail merchandise display device, comprising:

a pair of side supports in opposed spaced relation, the side supports defining an opening between the pair of side supports providing access to a retail merchandise containment region between the pair of side supports;

a shield positioned adjacent the opening; and at least one alarm device positioned between the pair of side supports, the shield mounted to the at least one alarm device between the pair of side supports a shelf defining a merchandise support surface upon which the merchandise is vertically supported;

wherein:

the pair of side supports are side panels;

each side panel includes a lateral stepped region, the lateral stepped region being in contact with the shelf and extending laterally outward from the corresponding side panel;

each side panel includes a downward extending alignment flange that extends downward from the lateral stepped region;

the shelf extending laterally between first and second ends;

the downward extending alignment flange of one side panel extending over the first end and the downward extending alignment flange of the other side panel extending over the second end such that the shelf is positioned laterally between the downward extending alignment flanges.

14. The retail merchandise display device of claim 13, wherein the shield is pivotable from a lowered position wherein the retail merchandise containment region is not accessible through the opening, and a raised position wherein the retail merchandise containment region is accessible through the opening.

15. The retail merchandise display device of claim 14, wherein the at least one alarm device is arranged to detect at least one of a transition of the shield from the lowered position to the raised position, or a transition from the raised position to the lowered position, and product an alarm signal based on said transitioning.

16. The retail merchandise display device of claim 15, wherein the alarm signal is at least one of a radio transmission, a flashing light, and an audible tone.

17. The retail merchandise display device of claim 13, wherein the side supports are side panels that extend vertically below a bottom edge of the shield when the shield is in the lowered position.

18. A retail merchandise display device, comprising:

a pair of side supports in opposed spaced relation, the side supports defining an opening between the pair of side supports providing access to a retail merchandise containment region between the pair of side supports;

a shield positioned adjacent the opening, the shield pivotable from a lowered position wherein the retail merchandise containment region is not accessible through the opening, and a raised position wherein the retail merchandise containment region is accessible through the opening;

at least one alarm device arranged to detect at least one of a transition of the shield from the lowered position to the raised position, or a transition from the raised position to the lowered position, the at least one alarm device configured to produce an alarm signal upon detection of said transitioning;

a product support device positioned between the pair of side supports for supporting merchandise between the pair of side supports and wherein the at least one alarm device includes a pivotable mounting plate, the shield attached to the pivotable mounting plate;

wherein the product support device includes:

a peg hook support bar extending between the pair of side supports; and at least one peg hook structure mounted to the peg hook support bar such that the at least one peg hook structure extends within the retail merchandise containment region, the at least one peg hook structure configured to support retail merchandise in a hanging presentation.

19. The retail merchandise display device of claim 18, wherein each of the pair of opposed side supports are configured to mount to a retail merchandise display device wall as a cantilevered extension.

20. The retail merchandise display device of claim 18, wherein the alarm signal is at least one of a radio transmission, a flashing light, and an audible tone.

21. The retail merchandise display device of claim 20, wherein the at least one alarm device is configured to produce the alarm signal after the shield has remained in the raised position for a predetermined period of time.

22. The retail merchandise display device of claim 20, wherein the at least one alarm device is configured to produce the alarm signal upon completion of said transitioning from the lowered position to the raised position or upon completion of said transitioning from the raised position to the lowered position.

23. The retail merchandise display device of claim 18, further comprising a remote alarm device, the remote alarm device configured to receive the radio transmission from the at least one alarm device, the remote alarm device configured to product a local alarm.

24. The retail merchandise display device of claim 18, wherein the at least one alarm device is removable.

25. A retail merchandise display device, comprising:

a pair of side supports in opposed spaced relation, the side supports defining an opening between the pair of side supports providing access to a retail merchandise containment region between the pair of side supports;

a shield positioned adjacent the opening, the shield pivotable from a lowered position wherein the retail merchandise containment region is not accessible through the opening, and a raised position wherein the retail merchandise containment region is accessible through the opening;

at least one alarm device arranged to detect at least one of a transition of the shield from the lowered position to the raised position, or a transition from the raised position to the lowered position;

an alarm device support bar positioned between the pair of side supports, wherein the at least one alarm device is mounted to said alarm device support bar;

wherein:

each side support extends between a front end and a rear end, the rear end of each side support includes a mounting hook for attaching to an upright retail merchandise display device support structure;

a peg hook support bar extending between the pair of side supports, the peg hook support bar extending parallel to said alarm device support bar, the peg hook support bar being positioned between the front ends of the pair of side supports and the mounting hooks of the pair of side supports such that the peg hook support bar is spaced away from the upright retail merchandise display device support structure when mounted to the upright retail merchandise display device support structure; and a peg hook mounted to the peg hook support bar positioned laterally between the side supports and extending forward of the peg hook support bar.

* * * * *